(12) United States Patent
Klier

(10) Patent No.: US 9,377,216 B2
(45) Date of Patent: Jun. 28, 2016

(54) OVERHEAT PROTECTION MECHANISM FOR SOLAR THERMAL COLLECTOR

(75) Inventor: Shimon Klier, Savyon (IL)

(73) Assignee: TIGI LTD, Neve Yarak (IL)

( * ) Notice: Subject to any disclaimer, the term of this patent is extended or adjusted under 35 U.S.C. 154(b) by 167 days.

(21) Appl. No.: 13/983,069

(22) PCT Filed: Feb. 8, 2012

(86) PCT No.: PCT/IB2012/050559
§ 371 (c)(1),
(2), (4) Date: Aug. 1, 2013

(87) PCT Pub. No.: WO2012/110916
PCT Pub. Date: Aug. 23, 2012

(65) Prior Publication Data
US 2013/0312735 A1    Nov. 28, 2013

Related U.S. Application Data

(60) Provisional application No. 61/442,849, filed on Feb. 15, 2011, provisional application No. 61/498,573, filed on Jun. 19, 2011.

(51) Int. Cl.
| | |
|---|---|
| *F24J 1/00* | (2006.01) |
| *F24J 2/04* | (2006.01) |
| *F24J 2/26* | (2006.01) |
| *F24J 2/32* | (2006.01) |
| *F24J 2/46* | (2006.01) |

(52) U.S. Cl.
CPC ............. *F24J 2/0477* (2013.01); *F24J 2/265* (2013.01); *F24J 2/32* (2013.01); *F24J 2/4621* (2013.01); *Y02E 10/44* (2013.01)

(58) Field of Classification Search
CPC ...................................... F24J 2/07; F24J 2/30
USPC .......................... 126/636, 714, 679, 635, 661
See application file for complete search history.

(56) References Cited

U.S. PATENT DOCUMENTS

| | | | |
|---|---|---|---|
| 4,280,480 A | 7/1981 | Raposo | |
| 4,382,437 A * | 5/1983 | Woods et al. | 126/586 |
| 4,438,759 A * | 3/1984 | Kitajima et al. | 126/635 |
| 4,766,885 A * | 8/1988 | Muramatsu | 126/636 |

(Continued)

FOREIGN PATENT DOCUMENTS

| | | |
|---|---|---|
| AU | 2006203413 A1 | 5/2007 |
| EP | 1956318 | 8/2008 |

(Continued)

*Primary Examiner* — Avinash Savani
(74) *Attorney, Agent, or Firm* — Mark M. Friedman

(57) ABSTRACT

An overheat protection device (OPD) is implemented independently of the circulating system of a solar thermal collector and isolated from the environment. The system facilitates operation of a solar thermal collector at elevated internal temperatures (versus reducing or ceasing operation above a critical temperature). OPD includes a heat pipe filled with at least two fluids. In a non-heat conducting state, a temperature at an evaporator portion of the heat pipe is below a transition temperature and the dual-fluid includes at least one fluid in a liquid state and at least one fluid in a gaseous state. When the temperature at the evaporator is above the pre-defined transition temperature the OPD undergoes an abrupt transition to a heat conducting state, whereby the dual-fluid transfers heat from the evaporator area to the condenser area, thus transitioning from a state of thermal isolation from an environment to one of strong thermal coupling.

16 Claims, 8 Drawing Sheets

(56) References Cited

U.S. PATENT DOCUMENTS

2011/0277981 A1* 11/2011 Muthurama-lingam ............... B01D 53/1425 165/200

FOREIGN PATENT DOCUMENTS

| | | |
|---|---|---|
| GB | 2058333 | 4/1981 |
| WO | 2008/056013 | 5/2008 |
| WO | 2012110916 A3 | 8/2012 |

* cited by examiner

| Weight Percentage of glycol (%EG) | Boiling point (°C) |
|---|---|
| 0 | 100 |
| 10 | 102 |
| 20 | 102 |
| 30 | 104 |
| 40 | 104 |
| 50 | 107 |
| 60 | 110 |
| 70 | 116 |
| 80 | 124 |
| 90 | 140 |
| 100 | 197 |

FIGURE 7

OVERHEAT PROTECTION MECHANISM FOR SOLAR THERMAL COLLECTOR

FIELD OF THE INVENTION

The present invention generally relates to solar energy collectors, and in particular, concerns an overheat protection mechanism for solar thermal collectors.

BACKGROUND OF THE INVENTION

Referring to FIG. 1, a diagram of a typical solar collecting system, solar thermal units 100, also known as solar thermal collectors, solar energy collectors, solar panels, or solar modules, convert solar radiation to thermal energy for a variety of applications 102 within residential or industrial structures. Typical applications include water heating 104, space-heating 106, industrial process heating 108, solar cooling 110, and other applications 112. A variety of solar thermal collectors are commercially available, and deployment, operation, and maintenance of conventional solar thermal collectors is well known in the industry. For clarity in this document, the singular term application is often used but does not imply limiting to a single application, and one ordinarily skilled in the art will understand that multiple applications are included. In the context of this document, references to the term solar collecting system generally refer to one or more solar thermal collectors, application components, and related support components.

Thermally insulating panels transmissive to solar radiation, while having low transmissivity to thermal infra-red radiation, have been disclosed in U.S. Pat. Nos. 4,480,632, 4,719,902, 4,815,442, 4,928,665, and 5,167,217 all to Klier and Novik. The thermally insulating panel, also called transparent insulation material or thermal diode, may be a honeycomb made of synthetic material or glass which is transparent to solar infrared (IR) radiation and visible wavelength light, and may be opaque to thermal IR back-radiation, as a result of the optical properties of the material and the geometry of the material and/or the panel. At the same time, the transparent insulation material is a thermal convection suppressor as a result of the geometry and physical characteristics of the material, and a thermal conduction suppressor as a result of the thermal properties of the material, including for example, thin walls of a honeycomb.

This imbalance of the transparency to incoming solar radiation versus and the restricted energy losses due to low convection and conduction, in conjunction with possible suppression of thermal IR back-radiation, creates a thermal diode and enables the capturing of heat and use of that captured heat for a variety of energy applications. The use of thermal insulation panels enables much greater energy conversion efficiencies over a much broader range of ambient temperatures and conditions, especially in colder climates as compared to systems that do not use a thermal insulation panel. In certain implementations, the solar absorption surface is coated with a spectrally selective layer that suppresses thermal re-emission in the thermal infrared spectrum, obviating the need for the transparent insulation to be substantially opaque in the thermal infrared spectrum.

A solar thermal collector with transparent insulation material is known as an insulated solar panel. In this case "insulated" refers to the transparent insulation material, as opposed to the conventional insulation typically used in the back and sides of a solar thermal collector.

Insulated solar panels are available from TIGI of Neve Yarak, Israel. An insulated solar panel provides a solar thermal collector with much greater energy conversion efficiencies, as compared to conventional solar thermal collectors. This occurs particularly under conditions of substantial temperature differentials between the ambient temperature and the temperature of the circulating fluid (for example, heated water) inside the collector, for example in high latitudes in winter. Referring to FIG. 2, a plot of collector efficiency (h) as a function (X) based on temperature and solar irradiance (where X=$\Delta$T/G where $\Delta$T is the temperature difference between ambient and the average collector temperature and G is the global solar radiation). Higher values of X indicate colder and less sunny conditions. As can be seen from the current figure, the efficiency of an insulated solar panel remains high as the environment gets colder and/or the amount of available solar radiation decreases, as compared to a conventional flat panel collector. When the efficiency of a typical conventional flat panel collector drops to about zero (for example, in the range of 0 to 10%), an insulated solar panel can still operate at an efficiency of about 40%. Greater efficiencies in insulated solar panels, while providing greater benefits than conventional solar panels also create operational and maintenance challenges that must be addressed for successful operation. In particular, there is a need for an overheat protection mechanism for solar thermal collectors.

SUMMARY

According to the teachings of the present embodiment there is provided an apparatus for overheat protection including: a solar thermal collector including an absorber; and a heat pipe including: an evaporator containing at least two fluids, the combination of fluids configured to transfer heat as a dual-fluid heat transfer fluid the evaporator in thermal contact with the absorber; and a condenser operationally connected to the evaporator, the condenser is in thermal contact with an environment outside of the solar thermal collector; wherein in a non-heat conducting state a temperature at the evaporator is below a transition temperature and the dual-fluid heat transfer fluid includes at least one the fluid in a liquid state and at least one the fluid in a gaseous state; and in a heat conducting state the temperature at the evaporator is above the pre-defined transition temperature, and the dual-fluid heat transfer fluid transfers heat from the evaporator to the condenser.

In an optional embodiment, the solar thermal collector is an insulated solar panel. In another optional embodiment, the dual-fluid heat transfer fluid is configured to have an abrupt transition from a state of thermally isolating the evaporator from the condenser to a state of thermal coupling the evaporator to the condenser. In another optional embodiment, the abrupt transition occurs within an activation range of 10 degrees Celsius.

In an optional embodiment, the apparatus further includes an expansion volume operationally connected to the heat pipe, wherein as the temperature approaches the transition temperature, a portion of the dual-fluid heat transfer fluid flows from the heat pipe to the expansion volume, thereby extending a range of temperatures over which the internal pressure of the heat pipe remains within a given range around ambient pressure.

In another optional embodiment, the evaporator additionally functions as a heat storage device.

According to the teachings of the present embodiment there is provided an apparatus for overheat protection including: a solar thermal collector including an absorber; and a heat transfer mechanism including: an evaporator having an exit and a return, the evaporator containing a heat transfer fluid and in thermal contact with the absorber; a condenser having an input and an output, the condenser in thermal contact with an environment outside of the solar thermal collector; and at least one length of flexible piping connecting the evaporator to the condenser, the at least one length of flexible piping configured to be: in a collapsed state when a temperature at the absorber is below a pre-defined transition temperature corresponding to an internal pressure below ambient pressure, to prevent flow of the heat transfer fluid from the evaporator to the condenser, thereby thermally isolating the evaporator from the condenser, and disabling heat transfer from the evaporator to the condenser; and in an expanded state when the temperature at the absorber is above the pre-defined transition temperature corresponding to the internal pressure above ambient pressure, allowing flow of the heat transfer fluid from the evaporator to the condenser, thereby thermally coupling the evaporator to the condenser, and enabling heat transfer from the evaporator to the condenser.

In an optional embodiment, the solar thermal collector is an insulated solar panel. In another optional embodiment, the heat transfer fluid is a dual-fluid heat transfer fluid. In another optional embodiment, the at least one length of flexible piping connects the evaporator exit to the condenser input. In another optional embodiment, the at least one length of flexible piping connects the condenser output to the evaporator return. In another optional embodiment, the least one length of flexible piping is thermally insulating.

In an optional embodiment, the evaporator is inside the solar thermal collector. In an optional embodiment, the position of the condenser is outside the solar thermal collector and relatively higher than the evaporator.

In an optional embodiment, the condensed liquid returns from the condenser to the evaporator using gravity assisted return.

In an optional embodiment, the pre-defined transition temperature is in the range of 98 to 108 degrees Celsius (° C.). According to the teachings of the present embodiment there is provided a method for overheat protection including the steps of: deploying an evaporator in thermal contact with an absorber of a solar thermal collector, the evaporator containing at least two fluids, the combination of fluids configured to transfer heat as a dual-fluid heat transfer fluid; and deploying a condenser in thermal contact with an environment outside of the solar thermal collector, the condenser operationally connected to the evaporator, wherein in a non-heat conducting state a temperature at the evaporator is below a transition temperature and the dual-fluid heat transfer fluid includes at least one the fluid in a liquid state and at least one the fluid in a gaseous state; and in a heat conducting state the temperature at the evaporator is above the pre-defined transition temperature, and the dual-fluid heat transfer fluid transfers heat from the evaporator to the condenser.

In an optional embodiment, the solar thermal collector is an insulated solar panel.

In an optional embodiment, the dual-fluid heat transfer fluid is configured to have an abrupt transition from a state of thermally isolating the evaporator from the condenser to a state of thermal coupling the evaporator to the condenser. In another optional embodiment, the abrupt transition occurs within an activation range of 10 degrees Celsius. In another optional embodiment, the transition temperature is pre-defined before operation of the apparatus. In another optional embodiment, the transition temperature is adjusted to a second transition temperature after beginning operation of the apparatus.

In another optional embodiment, the transition temperature is adjusted by modifying a composition of the dual-fluid heat transfer fluid, the composition selected from the group consisting of: air/water, air/glycol/water, argon/water, argon/glycol/water, nitrogen/water, and nitrogen/glycol/water.

In another optional embodiment, the transition temperature is adjusted by a modification selected from the group consisting of: modifying a ratio of the at least two fluids in the dual-fluid heat transfer fluid; modifying an amount of dual-fluid heat transfer fluid in the apparatus; modifying the condenser volume; modifying the evaporator volume; modifying an internal pressure of the apparatus; and addition of an expansion volume to the condenser;

In an optional embodiment, the current method includes the step of: deploying an expansion volume operationally connected to the condenser, wherein as the temperature approaches the transition temperature, a portion of the dual-fluid heat transfer fluid flows from the heat pipe to the expansion volume, thereby extending a range of temperatures over which the internal pressure of the heat pipe remains within a given range around ambient pressure.

In another optional embodiment, the evaporator additionally functions as a heat storage device.

According to the teachings of the present embodiment there is provided a method for overheat protection including the steps of: deploying an evaporator having an exit and a return, the evaporator containing a heat transfer fluid and in thermal contact with an absorber of a solar thermal collector; deploying a condenser having an input and an output, the condenser in thermal contact with an environment outside of the solar thermal collector; and deploying at least one length of flexible piping connecting the evaporator to the condenser, the at least one length of flexible piping configured to be: in a collapsed state when a temperature at the absorber is below a pre-defined transition temperature corresponding to an internal pressure below ambient pressure, to prevent flow of the heat transfer fluid from the evaporator to the condenser, thereby thermally isolating the evaporator from the condenser, and disabling heat transfer from the evaporator to the condenser; and in an expanded state when the temperature at the absorber is above the pre-defined transition temperature corresponding to the internal pressure above ambient pressure, allowing flow of the heat transfer fluid from the evaporator to the condenser, thereby thermally coupling the evaporator to the condenser, and enabling heat transfer from the evaporator to the condenser.

In an optional embodiment, the solar thermal collector is an insulated solar panel.

In another optional embodiment, the heat transfer fluid is a dual-fluid heat transfer fluid.

BRIEF DESCRIPTION OF FIGURES

The embodiment is herein described, by way of example only, with reference to the accompanying drawings, wherein:

FIG. 7 is a chart shows the atmospheric boiling point in degrees Celsius of a glycol/water dual-fluid based on the weight percentage of glycol (% EG).

DETAILED DESCRIPTION

Figure 1:
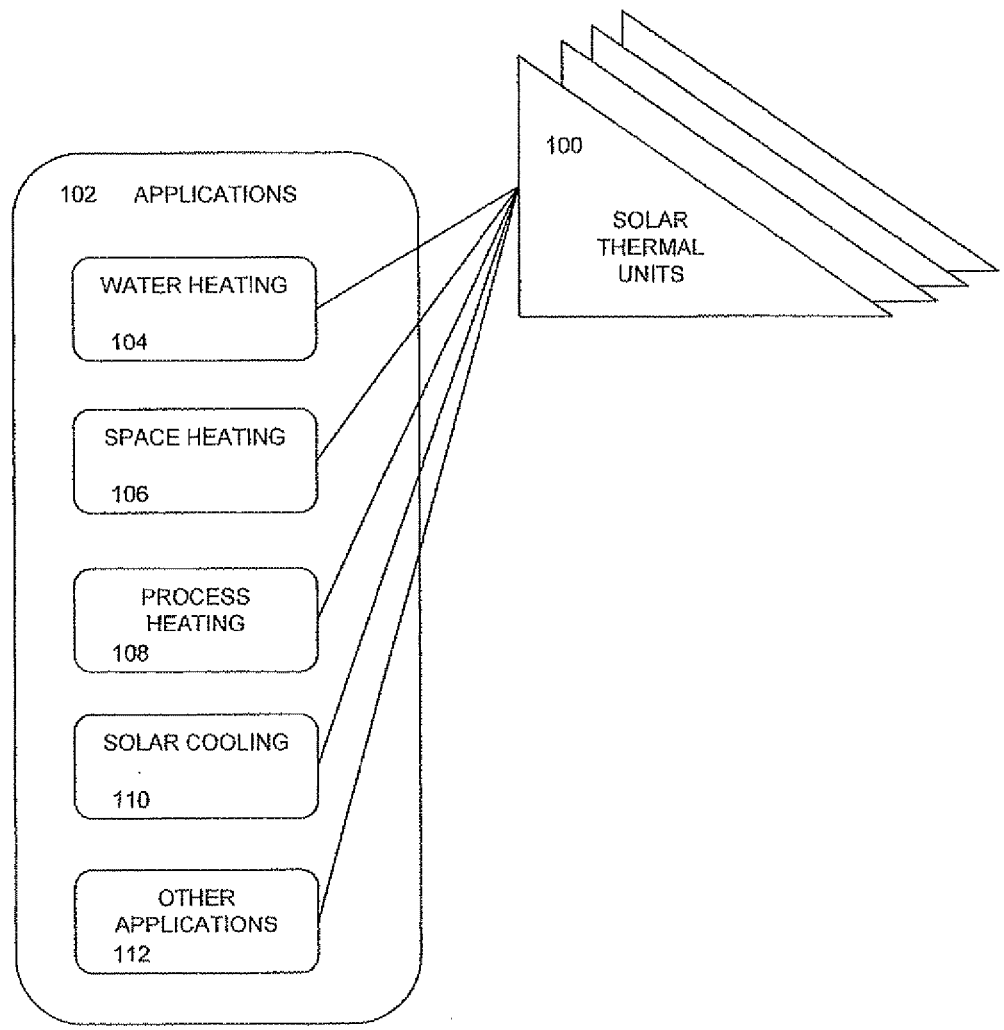
FIG. 1 is a diagram of a typical solar collecting system.
Figure 2:
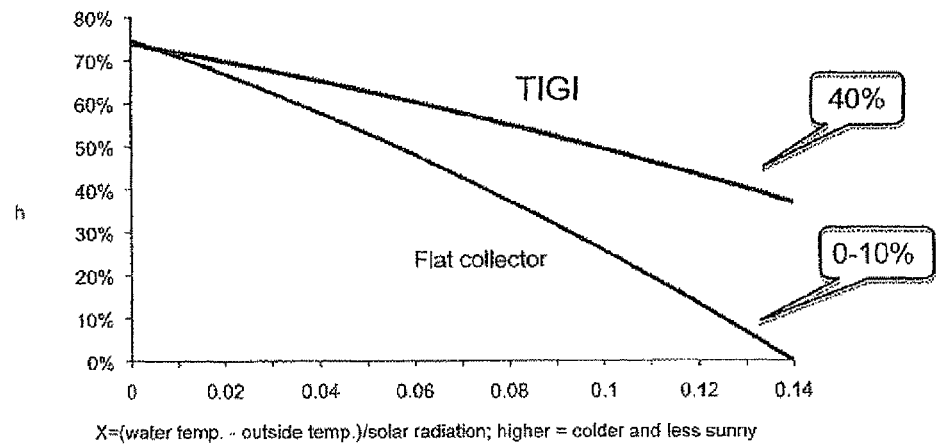
FIG. 2 is a plot of collector efficiency (h) as a function (X) based on temperature and solar irradiance.

The principles and operation of the system according to a present embodiment may be better understood with reference to the drawings and the accompanying description. A present invention is a system and method for overheat protection for solar thermal collectors. The system facilitates a passive or active overheat prevention device that can be implemented independently of the circulating system of a solar thermal collector and isolated from the environment. The system facilitates operation of a solar thermal collector at elevated internal temperatures (as opposed to reducing or ceasing operation above a critical temperature). Passive or active limiting of temperature inside a solar thermal collector by the automated temperature induced action of an actuator causes an abrupt transition from a state of thermal isolation from an environment to one of strong thermal coupling.

The invention currently described can be applied for the more efficient utilization and conservation of energy resources. Solar collection panels are widely known as an enabler of "green technology", providing for example, hot water for domestic and industrial use. The source of energy for solar collection panels is solar energy, a primary renewable energy source.

Use of solar collection panels in place of conventional, non-renewable, energy sources directly contributes to the reduction of green house gas emissions. In particular, embodiments of the current invention can be used to make better use of existing resources, as well as enable deployment of new, higher efficiency collectors, that operate over a wider range of temperatures and enable operation at a wider range of irradiance of incident solar radiation.

These features facilitate deployment of solar thermal collectors in locations that were previously not cost effective to operate, and extend operation of the solar thermal collector during periods of decreased sunlight.

An overheat protection device includes a heat pipe filled with at least two fluids, the combination of fluids configured to transfer heat as a dual-fluid heat transfer fluid. In a non-heat conducting state, a temperature at an evaporator portion of the heat pipe is below a transition temperature and the dual-fluid includes at least one fluid in a liquid state and at least one fluid in a gaseous state. In a heat conducting state, the temperature at the evaporator is above the pre-defined transition temperature and the dual-fluid transfers heat from the evaporator area to the condenser area.

Optionally, at least one length of flexible piping connects the evaporator to the condenser. The flexible piping is configured such that in a collapsed state a temperature at the absorber (at an evaporator portion of the heat pipe) is below a pre-defined transition temperature, correspondingly an internal pressure of the heat pipe is below ambient pressure, and the flexible piping constricts sufficiently to prevent significant flow of the heat transfer fluid from the evaporator to the condenser, thereby thermally isolating the evaporator from the condenser. The flexible piping is configured such that in an expanded state, the temperature at the absorber is above the pre-defined transition temperature, corresponding to an internal pressure at or above ambient pressure, and the flexible piping relaxes sufficiently to allow significant flow of the heat transfer fluid from the evaporator to the condenser, thereby thermally coupling the evaporator to the condenser. An additional feature of the flexible connector is that the flexible connector is manufactured from a thermally insulating material isolating the evaporator from the condenser below the transition temperature.

In an insulated solar panel, innovative solutions are required to allow operation at temperatures that are typically significantly higher than in conventional solar thermal collectors, in order to enable temperature limitation to prevent damage of the insulated solar panel. A feature of the below-described embodiments for temperature limiting in insulated solar panels is that the temperature limiting is provided by the insulated solar panel, as opposed to conventional systems that either rely on the connected applications for temperature limiting or cease operating when the temperature of the solar thermal collector exceeds a conventional operating range. Another feature of the below-described embodiments is that the embodiments can be implemented independently of the sealed components of a solar thermal collector, that is, the internal components of a solar thermal collector can remain isolated from the environment, while the internal temperature of the solar thermal collector can be limited via thermal coupling with the environment. Additional features facilitated by the below embodiments include implementation as passive closed systems within the sealed solar thermal collector, while also allowing alternative implementations as active systems and/or portions of the temperature limiting system outside the sealed solar thermal collector.

In order to extend the lifetime and guarantee the performance of a solar thermal collector, solar thermal collectors are sometimes sealed, as is the case for example with vacuum tube collectors or noble gas filled collectors. In the current embodiment, such sealing enables isolation of the internal components, such as the transparent insulation, from the environment. Sealing is of particular importance in insulated solar panels, since condensation (of water) could otherwise occur on the inner surface of the collector front panel where the transparent insulation comes in contact with the transparent cover of the panel. Such condensation is difficult to remove in the presence of transparent insulation, and may produce short-term efficiency reduction and long-term degradation of the collector. In the context of this document, the term "environment" generally refers to the area outside of a solar thermal collector, and is also known as the ambient atmosphere. The environment includes, but is not limited to the air (in Earth applications) or vacuum (in space applications) surrounding a solar thermal collector and/or the material(s) to which the solar thermal collector is adjacent, including but not limited to building walls and support structures for the solar unit. Sealing reduces the risks of condensation and residual chemical contamination. The sealed enclosure also enables replacement of ambient gas within the solar thermal collector with a medium of superior thermal characteristics, (slower conduction and convection) such as Argon or Krypton. However, sealing the solar thermal collector creates new challenges, such as risks related to pressure build up and catastrophic breakdown of the enclosure. For an insulated solar panel, these risks are exacerbated by the increased volume of the solar panel due to the inclusion of a transparent insulating layer, together with the wider range of temperature fluctuation enabled by the transparent insulation.

For solar collecting systems, two temperatures are discussed, the internal temperature of the solar thermal collector and the temperature of the circulating fluid. In the context of this document, the tem "internal temperature" refers to the temperature inside a solar thermal collector or insulated solar panel, typically in an area near the absorber. In the context of this document, the term "absorber" refers to the typically black (usually metallic high thermal conductivity) surface that is responsible for absorbing the solar radiation and converting the solar radiation to heat, which is subsequently transferred out of the system by a heat transfer fluid (circulating fluid). Under extreme conditions, the internal temperature of a solar thermal collector can reach a stagnation temperature, which is a temperature at which energy is not withdrawn from the system, or in other words solar radiation energy is being input to the panel, but no additional energy is being withdrawn from the solar collecting system. The temperature of the circulating fluid is typically limited by safety devices associated with the applications. One popular example of safety devices are pressure relief valves that are used to prevent overheating and damage to components of an application.

Under normal operating conditions, conventional flat panel solar thermal collectors typically operate with internal temperatures in the range of 30 to 90 degrees Celsius (° C.), with stagnation temperatures of about 150° C., up to possibly 200° C. Conventional vacuum tube solar thermal collectors may reach a maximum operating temperature of about 130° C., with stagnation temperatures of about 200° C.

As mentioned above, an insulated solar panel provides a solar thermal collector with much greater energy conversion efficiencies, as compared to conventional solar thermal collectors. Correspondingly, the stagnation temperatures in an insulated solar panel are significantly higher than conventional solar thermal collectors, typically up to about 250° C., with internal temperatures of 270 to 300° C. possible. If the internal temperature of an insulated solar panel is not limited, the internal temperature could reach these significantly higher stagnation temperatures, resulting in damage to the components of the insulated solar panel. In contrast, conventional solar collecting systems typically reach stagnation at temperatures in the range of 160 to 200° C., are designed to withstand component damage at these temperatures, and there is no need to limit the temperature in the solar thermal collector.

Overheat Protection Device (OPD)—Heat Pipe as a Passive Thermal Switch $T_0$ operate an insulated solar panel at the above-described temperatures and prevent damage to the insulated solar panel and solar collecting system, innovative solutions are required to limit the stagnation temperature of the insulated solar panel. For clarity in this description, the invention is generally described in relation to an insulated solar panel. Note that this invention can also be implemented in applications, including but not limited to solar thermal collectors such as conventional flat plate collectors.

One innovative solution includes using a loop heat pipe as a passive thermal switch, where the temperature induced action at a pre-determined temperature, designated transition temperature $T_0$, causes an abrupt transition from a state of thermal isolation from the environment to a state of strong thermal coupling. Details can be found in World Intellectual Property Organization application number PCT/IB2011/050208, and is included herein by reference.

Figure 3:
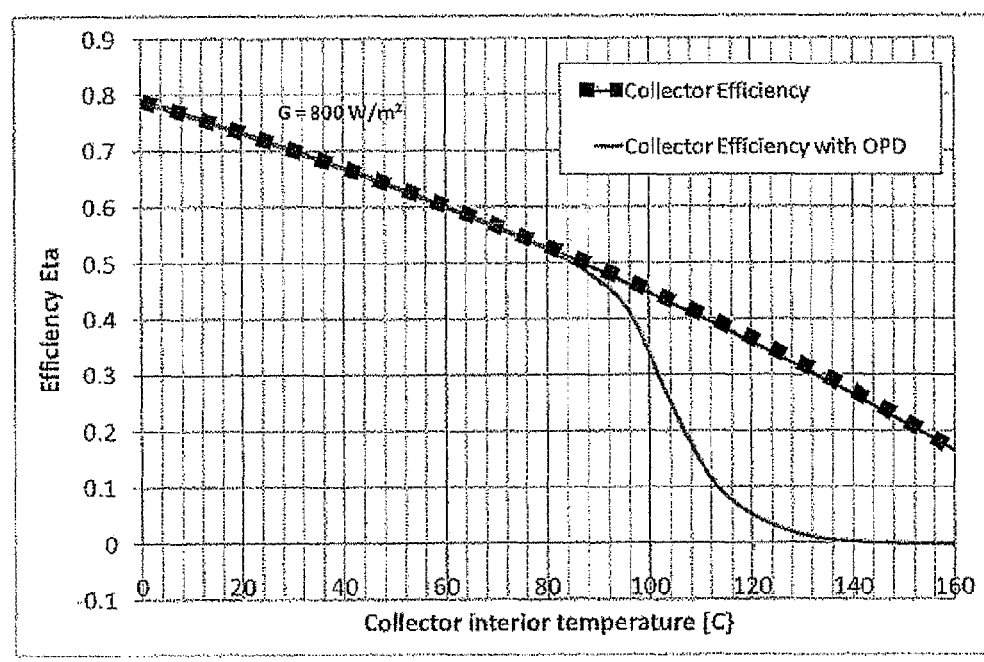
FIG. 3 is a plot of collector efficiency versus collector interior temperature for the case of solar insulation at 800 W/m$^2$ with and without an overheat prevention device (OPD).

An example of the effect of the overheat prevention device (OPD) on collector efficiency as a function of collector interior temperature is shown in FIG. 3, a plot of collector efficiency versus collector interior temperature for the case of solar insulation at 800 W/m2 with and without an overheat prevention device (OPD), for a transition temperature $T_0$ of 100° C. As is evident from the figure, the collector efficiency rapidly drops off as the collector interior temperature rises above 100° C. shedding energy to the environment. In one embodiment, the loop heat pipe includes an independent circulating system with a separate fluid from the primary loop that transfers heat from the collector to an application. There is a significant advantage to having an overheat prevention solution at the collector level as opposed to the system level, as having an overheat prevention solution at the collector level obviates the need for additional hardware to be installed at the system level, for instance a heat dump operating on the primary heat transfer loop. Furthermore, common practice is to install so-called drain-back systems in order to avoid the risk of pipe damage due to freezing ambient winter temperatures. This is desirable as use of a drain-back system enables the replacement of glycol with water as the primary heat transfer fluid in the solar panel, since the anti-freeze characteristics of glycol are no longer necessary. There is however a major risk factor with such drain-back systems, since in the absence of any fluid in the primary loop, collector temperature can rapidly rise and reach stagnation, causing collector damage.

Figures 4A, 4B:
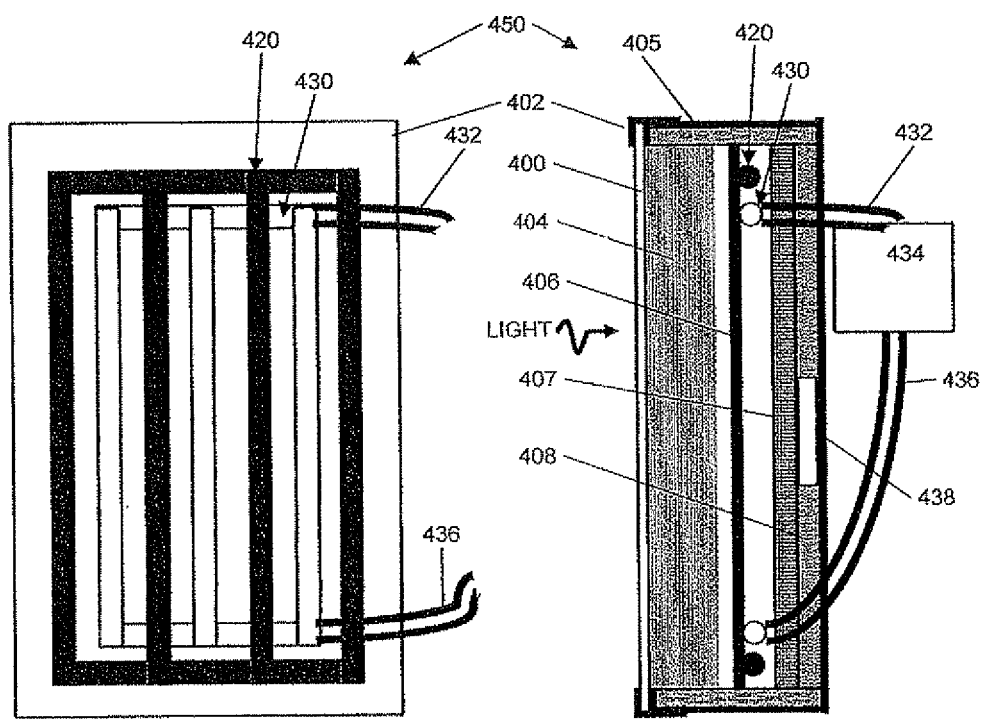
FIG. 4A is a diagram of front view of an overheat protection device that operates as a thermal isolator below transition temperature $T_0$ and as a thermal coupler above such temperature.
FIG. 4B is a diagram of cross-section view of an overheat protection device that operates as a thermal isolator below transition temperature $T_0$ and as a thermal coupler above such temperature.

This risk factor is removed if a collector level OPD is implemented. Refer to FIG. 4A and FIG. 4B, respective diagrams of a front view and cross-section view of an insulated solar thermal panel (collector) 450 with an overheat protection device that operates as a thermal isolator below transition temperature $T_0$ and as a thermal coupler above the transition temperature. Note that in the following diagrams, the collectors, such as insulated solar thermal panel 450 are drawn vertically for clarity and simplicity. One skilled in the art will realize that normal installation of a collector is at an angle, the angle depending on the requirements of the installation.

Glass 400 is held by a frame 402 allowing LIGHT (as near IR and visible wavelength light are typically referred to in this context) to reach absorber 406. Typically, glass 400 is low emissivity (low-E) glass. Absorber 406 is also known as an absorber plate. An exterior surface, or face, of the low-E glass that is positioned for accepting solar radiation, or in general terms facing toward the source of solar radiation is also known as the surface of the collection panel. Circulation pipes for primary heat transfer loop 420 (also known as a primary loop, shown in black, and in the cross-section view as shown by circles below/behind absorber 406) circulate a transfer fluid to absorb heat from the absorber 406 and transfer the heat to applications. Note that for clarity in the figure, connections between primary heat transfer loop 420 and applications are not shown. Note also that for clarity a single solar panel is shown. Typically, multiple solar panels are used with serial and/or parallel connections between solar panels within a solar array. In a case like this connections to and from circulation pipes of a single solar panel can be from or to (respectively) applications or one or more solar panels. Configuration and connection between solar panels and applications will be obvious to one skilled in the art. Insulation 407, such as Melamine insulation, provides an internal insulator between the back of the absorber plate 406 and the backside of the solar panel. Lateral insulation 405 and rear thermal insulation 408, on sides and back, respectively provide a thermal barrier between the interior of the solar thermal panel and the environment.

An insulated solar panel is a solar thermal collector with a layer of transparent insulation material for the surface of the collection panel. Transparent insulation 404 has been integrated into the solar panel between an interior surface of the collection panel (glass 400) and the absorber 406. LIGHT is transmitted (passes) through transparent insulation 404 to reach absorber 406. In this case "insulated" refers to the transparent insulation 404 material behind the surface of the collection panel—inside the solar panel, between the glass 400 and absorber 406, as opposed to the conventional insulation typically used in the back and sides of a solar thermal collector (405, 408).

Evaporator 430 circulation pipes (shown in white and in the cross-section view as shown by circles below/behind absorber 406) provide an evaporator section of a heat pipe. A first section of the heat pipe, which functions as the evaporator, is shown as a harp pipe that is thermally coupled to the absorber plate 406 of the collector. The term harp pipe is used to indicate that there is more than a single flow path between the top and the bottom of the evaporator. The use of the term harp pipe for clarity of explanation should not preclude the option of using only a single flow path and/or other heat pipe configurations depending on the specific application. A significant feature of this embodiment is that the heat pipe evaporator 430 is an independent structure from the primary heat transfer loop 420 of the collector. A second section of the heat pipe, which functions as a condenser 434, is a radiator (or any other convenient configuration such as serpentine piping) which is thermally coupled to the environment. In the current figure, the condenser is external to the aluminum case of the collector. This has an advantage of heat transfer efficiency but does not preclude the option of placing (as shown by 438) the condenser within the aluminum casing of the collector but outside the collector insulation 407, so that the condenser is inside the collector and in thermal contact with the environment. Condenser input connections 432 connect the evaporator to the condenser and condenser output connections 436 connect the condenser to the evaporator.

In the current figure, the condenser 434 (or alternatively 438) is specified as being coupled to the external environment directly, however, any other mechanism for thermal coupling of the fluid to the environment could be possible such as coupling via a heat sink such as the frame 402 of the collector. Another option is the additional of a thermostatic valve (not pictured) to create an abrupt transition from isolated to coupled conditions.

Figures 5A, 5B:
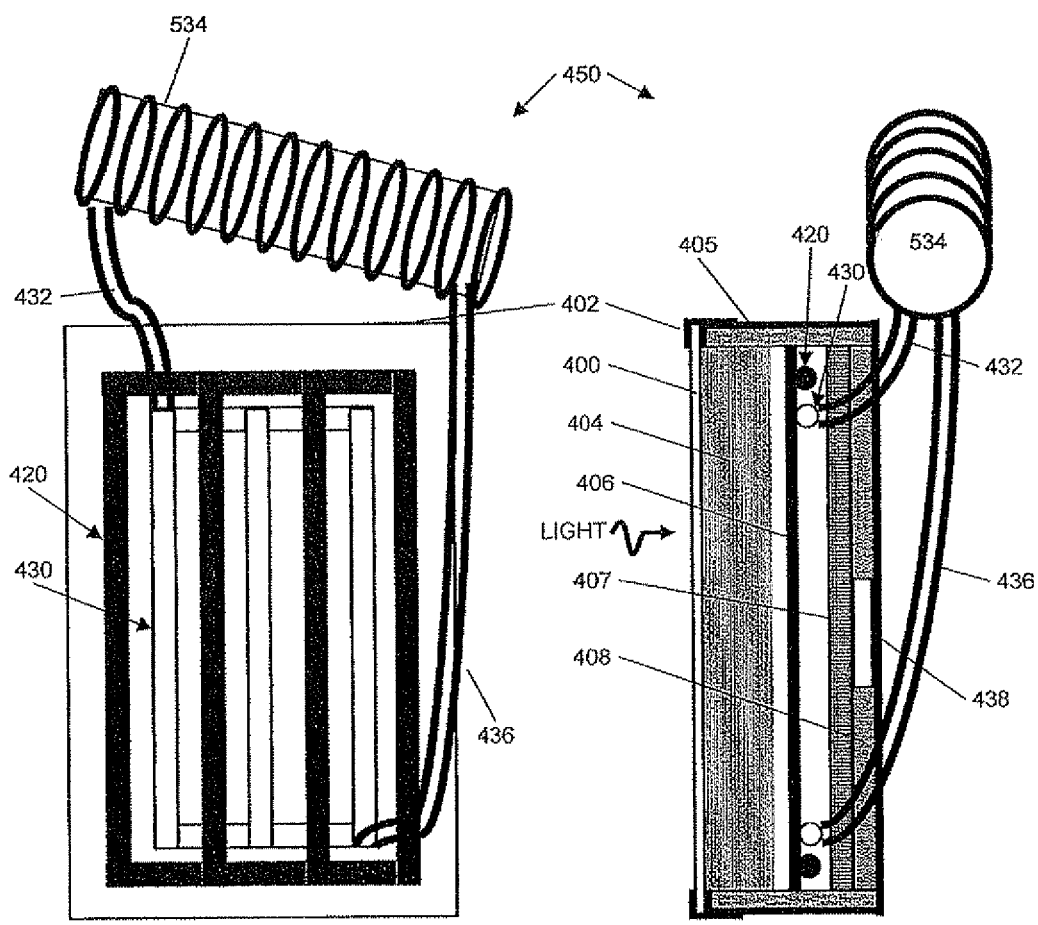
FIG. 5A is a diagram of front view of an OPD with condenser slightly tilted to ensure that condensed fluids drain back to the evaporator.
FIG. 5B is a diagram of cross-section view of an OPD with condenser slightly tilted to ensure that condensed fluids drain back to the evaporator.

Referring to FIG. 5A and FIG. 513, respective diagrams of a front view and cross-section view of an insulated solar thermal panel (collector) 450, with an OPD with condenser slightly tilted to ensure that condensed fluids drain back to the evaporator. In this alternative exemplary embodiment, condenser 434 is implemented as a tilted condenser 534 with a finned pipe and is slightly tilted to ensure that condensed fluids drain back to the evaporator.

An innovative and significant feature of the current invention is the ability to preset at manufacture, or set in the field, the transition temperature $T_0$ at which the OPD transforms from a thermally isolating state to thermally coupling state between the collector interior and the environment. This feature is important since different solar thermal applications require different supply temperatures, while different collector architectures may have different damage threshold temperatures. The desired configurability of $T_0$ can be achieved in a number of different ways as will be described below. An important reason for having a well defined threshold temperature for transition from thermally isolating to thermally coupling state is to ensure that below $T_0$, is to insure that the solar thermal collector's performance in terms of conversion efficiency is not compromised by parasitic heat loss through the overheat prevention device.

Innovative Use of a Dual-Fluid Heat Pipe

Conventional practice is to evacuate a heat pipe prior to the introduction of the heat transfer fluid. Current efforts in the field focus on insuring that only a single fluid is in the heat pipe, and extending the robustness and lifespan of the heat pipe to insure that no other fluids (including liquids and gases) leak into the heat pipe. An innovative use of a heat pipe is now described that includes filling a heat pipe under ambient temperature and pressure conditions. In other words, in contrast to conventional techniques, the heat pipe does not need to be evacuated prior to filling the heat pipe with a heat transfer fluid. For example, a heat pipe can be filled to 80% of the height of the evaporator with a heat transfer fluid, and the air that remains in the heat pipe fills the remaining portions of the evaporator, condenser, and connected portions. As such, in this configuration the heat pipe fluid has a dual composition such as air and water.

For clarity, exemplary embodiments are generally described as using an evaporator and condenser as parts of a heat pipe. Heat pipes generally include a wicking mechanism to facilitate return of condensed liquids from the condenser portion to the evaporator portion. The use of heat pipes in this document does not limit the invention to heat pipe based implementations, and alternative implementations without wicking mechanisms have been shown to be successful in providing overheat protection devices.

In the context of this document, the term "dual-fluid heat transfer fluid", or simply "dual-fluid" generally refers to the combination of at least two fluids configured to transfer heat. In the context of this document, the term "fluid" generally refers to a substance, such as a liquid or gas that is capable of flowing. Fluids are capable of changing shape depending on the container in which the fluid is placed. The term "dual-fluid" refers to two or more fluids being used together and/or having an effect on one another during use. The terms "liquid" and "liquid state" generally refer to substances composed of molecules that move freely among themselves but do not tend to separate like those of gases, that is, neither gaseous nor solid. The terms "gas" and "gaseous state" generally refer to substances in a physical state in which the substance does not resist change of shape and will expand indefinitely to fill any container.

In the context of this document, the terms "heat transfer" and "transferring heat" generally refer to the transfer of a significant amount of heat above a given amount, as opposed to parasitic heat loss. The given amount of heat transfer that is significant will depend on the application. Parasitic heat loss may occur in a non-heat conducting state resulting in the transfer of an amount of heat below the given amount. Preferably, the dual-fluid is designed with a threshold temperature $T_0$, also known as a transition temperature, for transition from a thermally isolating state a to thermally coupling state so as to ensure that below $T_0$, the OPD's performance in terms of conversion efficiency is not compromised by parasitic heat loss through the structure of the OPD.

For clarity of description, the transition temperature $T_0$ is generally referred to in the singular. One skilled in the art will realize that the transition temperature will vary in a range around a theoretical transition temperature. This range can be calculated based on the specific implementation of the OPD, and can be used by the OPD designer and tuners to benefit system operation, as described herein. It is foreseen that variations and combinations of the modifications described herein, alone or in combination with a range of transition temperatures can be used by one skilled in the art to implement the claimed OPD.

In the context of this document, the term "thermal contact" generally refers to two objects being configured relative to each other such that heat can be exchanged between the two objects. In contrast, the term "thermally isolated" generally refers to areas between which the heat exchange is substantially equal to zero or minimal parasitic exchange.

In the context of this document, the term "internal pressure" generally refers to the pressure due to the fluids internal to the OPD, and in particular to the one or more fluids internal to an evacuated or non-evacuated heat pipe, including an evaporator section and a condenser section. The term "ambient pressure" generally refers to the pressure outside of the OPD, in particular outside of the circulation system of the heat pipe, outside the evaporator and condenser. In typical cases where the solar thermal collector is being used in Earth's atmosphere (as opposed to applications such as space-based applications) the ambient pressure is atmospheric pressure, and the terms "ambient" and "atmospheric" may be used interchangeably.

The effect of such a dual-fluid heat transfer fluid composition is to substantially suppress internal pressure increase of the heat pipe interior as a function of collector interior temperature and solar irradiance level. By maintaining internal pressure at close to ambient pressure, the transition temperature $T_0$ will remain close to the atmospheric boiling point of the liquid component of the dual-fluid. Although the dual-fluid heat pipe internal pressure will increase with temperature and solar irradiance much more slowly than for the case of an evacuated heat pipe, the internal pressure will nonetheless display a weak positive dependence. The rate at which this residual internal pressure increases with internal temperature and irradiance is dependent on a number of system parameters that can be controlled. For example, the lower the ratio of liquid volume to gas volume the weaker the internal pressure rise dependence on temperature and irradiance.

In general, an apparatus for overheat protection, also referred to in this document as an overheat protection device (OPD) is based on a heat pipe. The heat pipe includes an evaporator containing at least two fluids, the combination of fluids configured to transfer heat as a dual-fluid heat transfer fluid. A condenser is operationally connected to the evaporator. In a non-heat conducting state a temperature at the evaporator is below a transition temperature and the dual-fluid includes at least one fluid in a liquid state and at least one fluid in a gaseous state. In a heat conducting state the temperature at the evaporator is above the pre-defined transition temperature and the dual-fluid transfers heat from the evaporator to the condenser.

The OPD can be used in a variety of applications, related and unrelated to solar thermal collectors. When used with a solar thermal collector, the evaporator is in thermal contact with the absorber and the condenser is in thermal contact with an environment outside of the solar thermal collector. The OPD is particularly useful when the solar thermal collector is an insulated solar panel. The dual-fluid is preferably configured to have an abrupt transition from a state of thermally isolating the evaporator from the condenser to a state of thermal coupling the evaporator to the condenser. In the context of this document, the term "abrupt transition" generally refers to a transition occurring within a typical "activation range" of about 10 degrees Celsius. In other words, an abrupt transition occurs in a margin around $T_0$, in which the fluid transitions from thermally isolating to thermally coupling. As described above, the transition temperature is actually a "transition temperature range", hence the term "abrupt transition" refers to the "transition temperature range" being within the "activation range". Depending on the specific application, an activation range other than the example typical activation range of 10 degrees Celsius may be desired. Based on this description, one skilled in the art will be able to select a specific activation range for a specific application. Tuning a transition temperature is a feature of the current embodiment, and is described further, below.

Adjusting the Transition Temperature

The ratio of liquid volume to gas volume can be controlled by configuring the system during manufacture or during installation, thereby tuning the transition temperature, $T_0$ of the OPD for a specific installation and/or application. The transition temperature can be set during manufacture and/or operation in the field by techniques including:
  modification of the liquid fill proportion of the evaporator,
  modification of condenser volume,
  modification of the composition of the liquid or gas,
  modification of the internal pressure of the system, and
  addition of an expansion volume.

In a case where the transition temperature is pre-defined before operation of the apparatus, the OPD can be set during manufacture, prior to deployment, and/or after deployment. The transition temperature may also be adjusted to a second transition temperature after beginning operation of the apparatus.

Note that the OPD maybe set or tuned more than one time, depending on the specific application and details of the installation. In a non-limiting example, an OPD is set for an initial transition temperature prior to operation. After monitoring operation of the OPD, a different transition temperature is desired, and one or more modifications are made to one or more components of the system, as described herein, to achieve the different transition temperature. In another non-limiting example, during the lifetime of a solar collector, reducing the transition temperature may be desirable to limit the internal temperature of the aging components of the collector and extend the collector lifetime.

A degree of freedom in the design of the dual fluid composition heat pipe is the modification of the liquid fill proportion of the evaporator. One modification is adjusting the combination of the fluid content of the heat pipe. In other words, modifying a ratio of the at least two fluids in the dual-fluid heat transfer fluid, The transition temperature can be adjusted by modifying a composition and/or ratio of the dual-fluid. Another optional modification is modifying an amount of dual-fluid in the apparatus. A non-comprehensive list of fluid composition combinations includes:
  Air/water
  Air/glycol/water
  Argon/water
  Argon/glycol/water
  Nitrogen/water
  Nitrogen/glycol/water A non-limiting example of using one dual-fluid is an air/glycol/water combination. The ethylene (or propylene) glycol/water liquid solution can be varied over a large range of ratios. This is important in facilitating an embodiment where the glycol/water ratio is used to modify the transition temperature of the device $T_0$ from being thermally insulating to thermally coupling between absorber plate and environment. The boiling point of the glycol/water mixture is composition dependent. Referring to FIG. 7, a chart shows the atmospheric boiling point in degrees Celsius of a glycol/water dual-fluid based on the weight percentage of glycol (% EG).

An additional and non-obvious feature of using a glycol/water mixture of the liquid component of the dual-fluid is due to the reduced vapor pressure below the boiling point, as compared with pure water (using water only as the heat-transfer fluid). This is important since using a glycol/water mixture reduces the residual parasitic heat transfer by the overheat protection device below the transition temperature $T_0$. Ethylene glycol in the presence of air may degrade as a result of thermal cycling, hence the addition of a stabilizing additive is also an option.

Another degree of freedom in the design of the dual fluid composition heat pipe is the modification of the volume of components of the OPD. The transition temperature can be adjusted by modification of the volume of components of the OPD, including, but not limited to modifying the condenser volume and modifying the evaporator volume. Having multiple degrees of freedom allows control of the transition temperature. Filling the evaporator as high as possible is desirable to ensure that the heat transfer mechanism operates over the full height of the absorber plate when the absorber plate reaches and exceeds the transition temperature.

The height to which the fluid reaches is also a function of angle of tilt of the collector, and is often varied depending on latitude and optimization for either summer or winter. This angle of tilt may restrict the liquid to air ratio which otherwise effects the transition temperature. Hence, the option of adding an expansion volume or modifying liquid composition can be desirable.

Another degree of freedom in the design of the dual fluid composition heat pipe is the modification of the internal pressure of the OPD. The transition temperature can be adjusted by modifying the internal pressure of the OPD, either during manufacture, installation, after beginning operations, and/or at a combination of times. Increasing or decreasing the internal pressure of the OPD in relation to ambient pressure results in a higher or lower transition temperature for the dual-fluid.

Expansion Volume

Figures 6A, 6B:
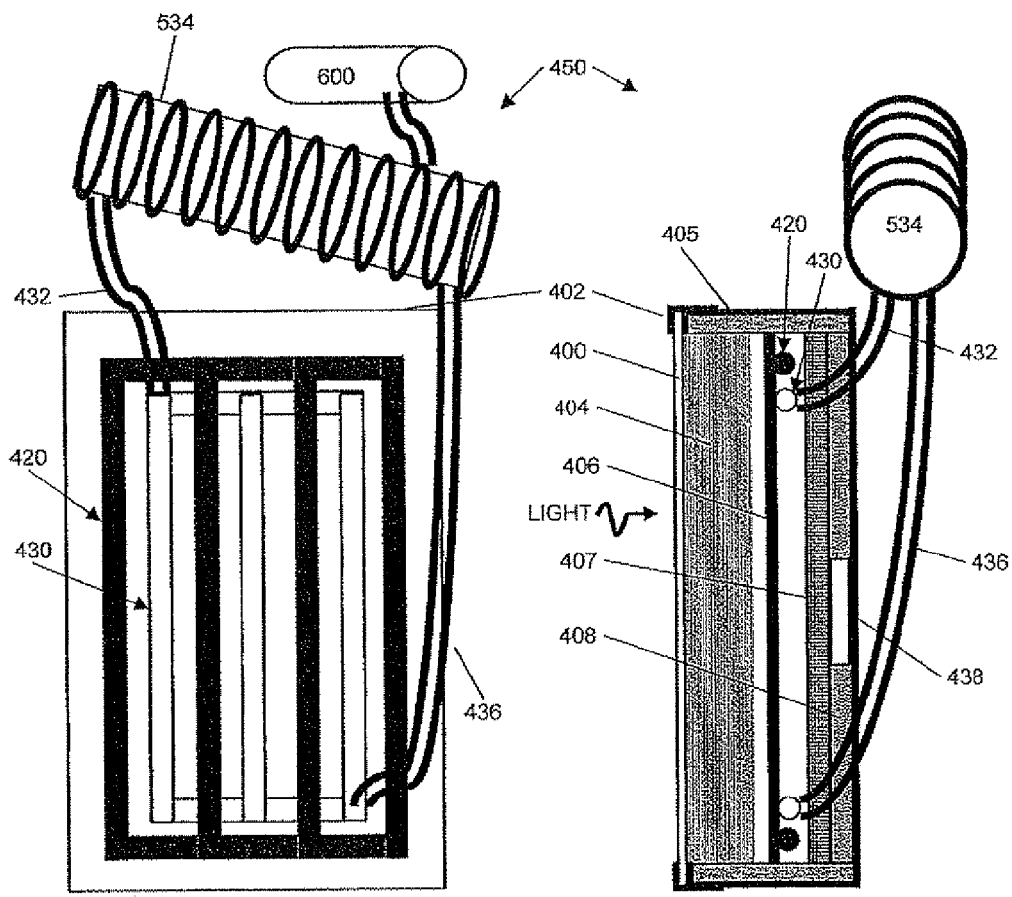
FIG. 6A is a diagram of front view of a non-limiting example of a collector design with an OPD includes an expansion volume.
FIG. 6B is a diagram of cross-section view of a non-limiting example of a collector design with an OPD includes an expansion volume.

Refer to FIG. 6A and FIG. 6B, respective diagrams of a front view and cross-section view of a non-limiting example of a collector design with an OPD including an expansion volume 600. The purpose of the expansion volume is to allow a portion of the dual-fluid that is in the gaseous state to escape from the condenser when the collector interior approaches the transition temperature, $T_0$ and vapor enters the condenser. As the temperature at the interior of the solar thermal panel increases, and hence the temperature at the evaporator increases and approaches the transition temperature, the internal pressure of the heat pipe starts to increase, and a portion of the dual-fluid starts to boil and transition from the liquid state to the gaseous state. Maintaining the internal pressure around one atmosphere (atmospheric pressure being the ambient pressure), helps maintain a specific desired transition temperature. Addition of an expansion volume provides a container into which the gas or vapor from the boiling liquid can flow, thereby maintaining the internal pressure at approximately ambient pressure as the temperature begins to increase. The expansion volume helps control the transition temperature by moderating internal pressure fluctuations.

Consider a simplified description of operation of the condenser portion of the OPD in regards to the well-known ideal gas law:

$$PV=nRT,$$

where P is pressure, V is volume, n is the amount of substance of gas, R is the ideal, or universal, gas constant, and T is temperature. In a case where the OPD has a fixed volume, as the temperature at the evaporator rises and vapor enters the condenser, the pressure in the condenser rises. The increased pressure in the condenser of the gaseous portion of the dual-fluid exerts an increased pressure on the liquid portion of the dual-fluid. This increased pressure raises the transition temperature of the liquid portion, thus creating a relatively strong dependence between the pressure and temperature. However, the addition of the expansion volume will slow the increase of pressure in the condenser of the gaseous portion of the dual-fluid by providing an additional volume into which to expand. This can be understood from the universal gas law, since $\delta P/\delta T \propto 1/V$, that is, the rate of pressure increase with temperature is inversely proportional to volume. This results in a weaker dependence between the pressure and temperature, as compared to a system without an expansion volume.

The volume, location, material, and construction of the expansion volume varies depending on the operational and installation requirements of the OPD. The expansion volume can be constructed of a rigid material or a deformable material, such as a flexible bladder. In contrast to a rigid expansion volume, a flexible bladder can expand and contract as the pressure inside the OPD varies, further helping control the transition temperature by moderating internal pressure fluctuations. The expansion and contraction of a flexible bladder can extend the range of temperatures over which the internal pressure inside the heat pipe remains close to ambient, and can in fact ensure almost constant ambient internal pressure over a wide range of temperatures.

If the expansion volume is located in thermal contact with the environment, another possibility is for vapor in the expansion volume to shed (transfer) heat to the environment, thus decreasing the temperature of the vapor. In this case, a portion of the cooling vapor may condense in the expansion volume and return to a liquid state. Given the possibility of liquid in the expansion volume, the expansion volume should preferably be configured to ensure that any residual liquid that condenses in the expansion volume will drain back to the evaporator. Referring to the current figures showing expansion volume 600 beside and above the condenser. In both figures, the expansion volume is located above the evaporator, allowing condensed liquid to drain back into the evaporator.

An expansion volume 600 can be added to the OPD in other locations (not shown) such as on the side of the condenser. In other applications (not shown), the expansion volume is located on the side of the evaporator. The expansion volume can be operationally connected to the condenser or to the evaporator. Based on this description, one skilled in the art will be able to select a location for the expansion volume that is appropriate for a specific application.

In general, the OPD apparatus can further include an expansion volume operationally connected to the heat pipe. As the temperature at the evaporator approaches the transition temperature, a portion of the dual-fluid flows from the heat pipe to the expansion volume, thereby extending a range of temperatures over which the internal pressure of the heat pipe remains within a given range around ambient pressure.

Typically, the gaseous portion of the dual-fluid is air, and the "expansion volume" is also referred to in the context of this document as an "air expansion volume". The use and reference to air as one of the fluids in the dual-fluid heat transfer fluid should not be considered limiting. As described above, other fluids, such as argon and nitrogen can be used.

Figure 10:
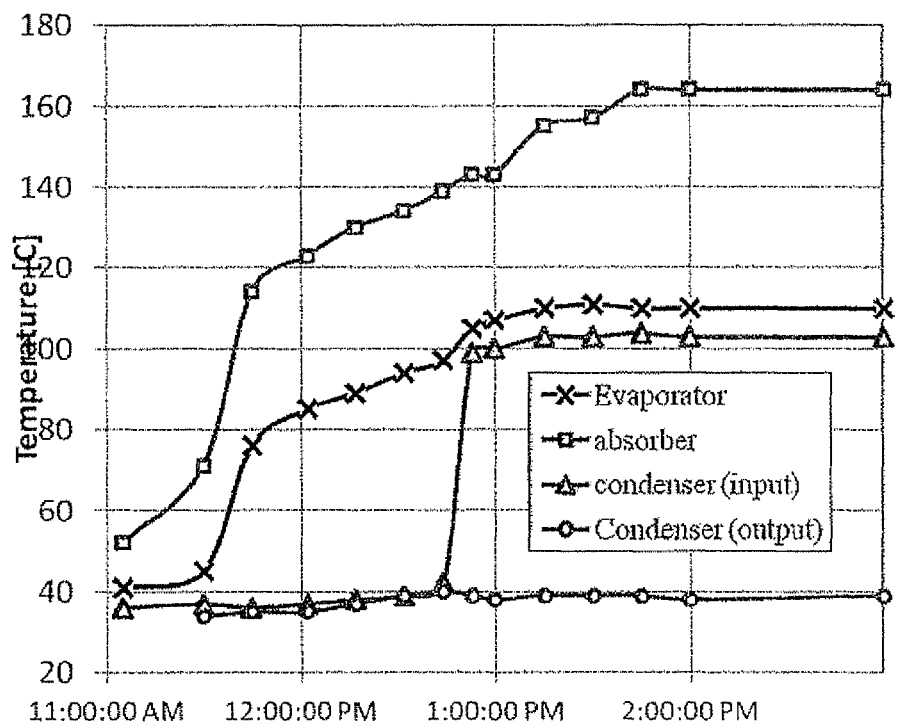
FIG. 10 is a plot of temperatures during operation of a dual-fluid OPD.

Refer to FIG. 10, a plot of temperatures during operation of a dual-fluid OPD. The vertical axis is temperature in degrees Celsius and the horizontal axis is time during the day. Significant exposure of the solar thermal collector to solar radiation (the sun) begins at about 11:00 in the morning, and continues through the afternoon hours. As can be seen from the plot, as the collector is exposed to sunlight, the temperature of the absorber (square data points) begins to rise. Correspondingly, after a time lag the temperature of the evaporator ("x" data points) begins to rise. The OPD is not active, and the temperature at the condenser (input and output) remains stable (at about 35° C., slightly above environmental temperature).

When the temperature of the evaporator approaches the transition temperature of the OPD (in this case 100° C.), at about 12:45, the OPD activates and the temperature at the input of the condenser (triangular data points) begins to rise.

During operation of the OPD (from 1:00 onward), the solar thermal collector continues to operate. The temperature at the absorber stabilizes at about 165° C. in this case, keeping the internal temperature of the collector below stagnation temperature, and preventing overheating of components of the collector. The temperature of the evaporator and corresponding temperature of the condenser input stabilize at about 110° C. and 105° C., respectively. The temperature of the condensed liquid returning from the condenser to the evaporator is show as the condenser output temperature (circular data points), which remains stable at slightly above environmental temperature.

OPD Integrated with Storage Collector

While solar thermal collectors, such as described above are generally used in conjunction with a remote storage tank, there is also a need to be able to integrate a storage tank close to the solar thermal collector. A storage tank, or storage collector, can provide an integrated solution for storing excess heat for subsequent use by an application. Placing a storage tank close to the solar thermal collector is known in the art, where close is generally in the location of the solar thermal collector, in contrast to a remote storage tank which is placed in the location of the application. A popular implementation of conventional placement of a storage collector close to a solar thermal collector is for providing hot water for domestic applications. In conventional storage collectors, fresh water is used (normally pressurized) and is available for immediate use.

In an innovative embodiment, a non-pressurized inert storage tank is used for storage and a pressurized "heat exchanger" such as a harp (or any other form) is used for energy circulation to the storage tank, for applications such as domestic hot water. A preferred optional feature of this embodiment is an innovative integration of an overheat protection device into a storage collector.

Figures 8A, 8B:
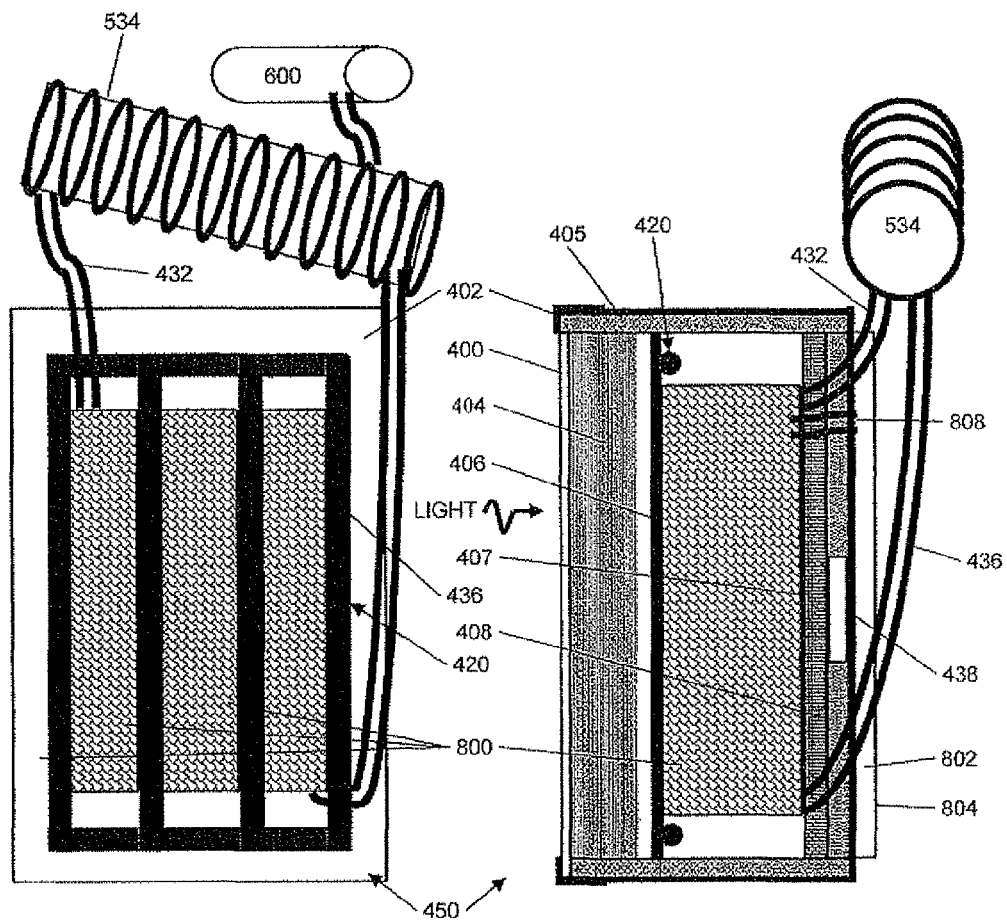
FIG. 8A is a diagram of front view of a solar thermal collector with integrated overheat protection device functioning as a storage collector.
FIG. 8B is a diagram of cross-section view of a solar thermal collector with integrated overheat protection device functioning as a storage collector.

Referring to FIG. 8A and FIG. 8B, respective diagrams of a front view and cross-section view of an exemplary diagram of a solar thermal collector with integrated overheat protection device functioning as a storage collector, a storage collector 800 is placed internal to the insulated solar panel 450 and in thermal contact with the absorber 406. In this implementation, storage collector 800 is in place of evaporator 430 circulation pipes (refer to FIG. 4).

Placement of the storage collector 800 inside the insulated solar panel 450 results in the storage collector being protected by the transparent insulation 404, thereby improving the overall collector efficiency due to reduced thermal losses to the environment via convection. In this embodiment, the storage volume plays a double role in the collector, acting also as the evaporator (element 430 in the previous figures) for the overheat protection device. In the above-described embodiments, a typical configuration of the evaporator can contain 0.1 to 10 liters of liquid (as a portion of the dual-fluid heat transfer fluid). In the current embodiment of using the evaporator for heat storage (as a storage collector), the evaporator can contain 10 to 200 liters of liquid.

As in the collector architectures described above, the overheat protection device functions as a loop heat pipe which is independent of the primary heat transfer loop 420 (which transfers heat to the application). However, in the current architecture, the evaporator is also a heat storage volume that may be filled with any of the chosen dual fluid combinations specified above. In addition, due to the evaporator's (800) physical separation from the primary heat transfer loop 420, the storage fluid could also be a phase change material. Furthermore, as in the architectures above, the storage collector overheat protection device may be augmented with any of the additional features such as a finned pipe condenser 534 or an expansion volume 600.

The storage collector may also have installed an expansion bag 802 connected via piping 808 to the storage collector (evaporator) 800 and expansion bag cover 804 so that the interior of the collector 450 remains hermetically sealed without building internal. pressure. Where the expansion bag is a flexible membrane, the expansion bag can be normally deflated at ambient temperatures less than the transition temperature. As the temperature at the absorber rises and approaches the transition temperature, the temperature at the storage collector 800 correspondingly rises, and evaporation of a portion of the dual fluid from liquid state to gas begins. The gas is able to expand into the expansion bag 802, stabilizing the internal pressure of the OPD at ambient pressure, thus stabilizing the transition temperature of the dual fluid as the internal temperature of the solar thermal collector rises. Based on this description, one skilled in the art will be able to select a location and connection from the storage collector (evaporator) 800 to the expansion bag 802.

Insulated Squeeze Valve

The above-described device and options are highly effective in providing an overheat protection device (OPD). The use of an innovative squeeze valve can provide additional efficiency in implementations including an evacuated heat pipe and systems with an internal pressure that is sub-ambient at ambient temperature. For clarity, a squeeze valve implementation will be described in combination with a solar thermal collector, as generally described above in reference to FIG. 4. This description does not limit the implementation, and implementations are possible with insulated solar panels, and other devices that would benefit from separation of portions during operation at different states of pressure.

Figure 9:
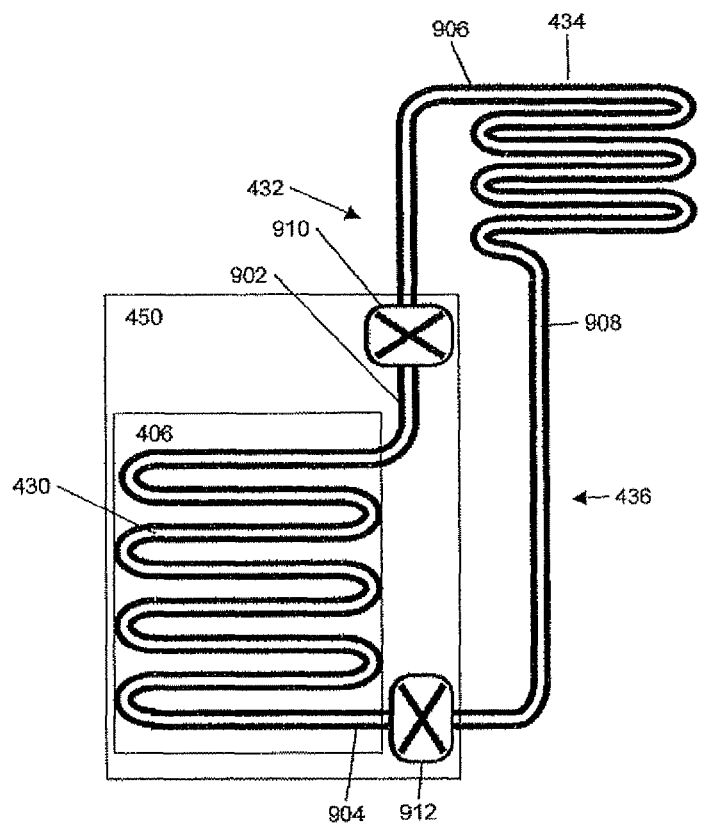
FIG. 9 is a diagram of an example implementation of using a squeeze valve for thermal isolation in an OPD.

Refer to FIG. 9, a diagram of an example implementation of using a squeeze valve for thermal isolation in an OPD. A first section of the heat pipe, which functions as the evaporator 430, is a serpentine pipe that is thermally coupled to the absorber plate 406 of the collector. A second section of the heat pipe, which functions as a condenser 434, is a serpentine pipe (or any other convenient configuration) which is thermally coupled to the atmosphere. Note that although a serpentine pipe is shown in the current figure, one skilled in the art will realize that a variety of condensers and/or evaporators can be used depending on the specific application. In an optional implementation, the condenser section includes a heat sink.

For clarity the upper end of the evaporator, from which evaporated fluid vapor exits the evaporator 430 toward the condenser 434 is referred to as an "exit" 902. The lower end of the evaporator, to which condensed fluid returns from the condenser and enters the evaporator, is referred to as a "return" 904. The upper end of the condenser, to which evaporated fluid vapor from the evaporator enters the condenser is referred to as an "input" 906. The lower end of the condenser from which condensed fluid exits the condenser to return to the evaporator is referred to as an "output" 908.

The exit (upper end of the evaporator) 902 is connected by a first length of flexible piping 910 to a rigid, preferably thermally conductive, pipe to the input (input/lower end) 906 of the condenser section. The length of the flexible piping is typically short, as compared to the lengths of the piping in the evaporator, condenser, and connecting pipes (conductive and non-conductive). The specific length of flexible piping depends on the application, type of tubing used, and the mechanical characteristics of the piping. Products, such as Teflon are generally available, and have been successfully used for the length of flexible piping. Based on this description on skilled in the art will be able to select an appropriate material, length, and width for the flexible piping.

The output (lower end of the condenser section/bulb) 908 is connected, by a rigid, preferably thermally conductive pipe and via a second (additional) short length 912 of flexible piping, back to the return (base of the evaporator section/bulb) 904.

Note that while the currently described implementation includes two lengths of flexible piping (910, 912), one length at each connection between the evaporator and condenser, in general implementations can include one or more lengths of flexible piping. For example, in a non-loop heat pipe, a single flexible length is used between the evaporator and condenser ends of a tube. In a single loop heat pipe (the single loop being between the evaporator and condenser) a single flexible length can be used at either the exit or return of the evaporator (or equivalently, at either the input or output of the condenser). In a case where more than one connection exists between the evaporator and condenser, each connection can include a length of flexible piping.

The closed loop heat pipe is evacuated prior to the introduction of the heat transfer fluid. As a result, the internal pressure of the heat pipe is solely due to the partial pressure of the vapor/liquid equilibrium. At temperatures below the boiling of the heat transfer fluid, the partial pressure of the heat transfer fluid will be sub-atmospheric. That is, the internal pressure of the condenser and evaporator sections will be equal to the vapor pressure of the heat transfer fluid. This internal pressure will therefore vary with temperature exactly as the vapor pressure of the fluid varies with temperature. This feature has an important functional significance, as will be described below.

Preferably, the one or more lengths of flexible piping are thermally insulating. In other words, the lengths of flexible piping are constructed of a non-thermally conducting material, serving to thermally insulate the thermally conducting piping of the evaporator section from the thermally conducting piping of the condenser section.

The one or more lengths of thermally insulating flexible piping can play multiple roles. Firstly, the thermally insulating flexible piping can act as heat transfer barrier so that the rigid (thermally conducting) piping sections connecting between the evaporator and the condenser do not conduct heat away from the absorber plate at temperatures below the transition temperature $T_0$ via the pipe itself, independent of the state of fluid flow within the pipe. Secondly, as the lengths of flexible piping are flexible, the flexible piping acts as pressure activated "squeeze valve", so that when the internal pressure of the heat pipe is below ambient pressure, the flexible piping is in a first, collapsed, state and flow of the heat transfer fluid is inhibited due to the pressure induced collapse of the flexible piping. When the pressure within the heat pipe reaches ambient pressure, the flexible piping transitions to a second, expanded, state, the pipe expands, and heat transfer fluid in the vapor state is allowed to move from the evaporator to the condenser and back, enabling strong thermal coupling between the absorber plate and the outside environment. As described above, since the internal pressure is always equal to the vapor pressure of the heat transfer fluid, the transition temperature $T_0$ will be the boiling point of the heat transfer fluid at ambient pressure since at the boiling point of a fluid the vapor pressure of the fluid equals ambient pressure; i.e. $T_o \equiv T_b(P_{atm})$.

In an alternative embodiment, the second short length (lower squeeze valve) 912 (from the condenser output to the evaporator return) is replaced with a rigid, but insulating section of pipe. In this case, the rigid insulating pipe section acts a heat conduction barrier, but allows the condensate to return to the evaporator gravitationally, independently of the absorber plate temperature. A one-way flow valve may also be implemented on the outside of the lower insulated pipe section to prevent fluid flowing in the opposite direction.

In general, an apparatus for overheat protection includes a solar thermal collector including an absorber and a heat transfer mechanism. The heat transfer mechanism includes an evaporator, condenser, and at least one length of flexible piping. The evaporator has an exit and a return. The evaporator contains a heat transfer fluid and is in thermal contact with the absorber. The condenser has an input and an output. The condenser is in thermal contact with an environment outside of the solar thermal collector. At least one length of flexible piping connects the evaporator to the condenser. The length of flexible piping is configured to have two states: A collapsed state and an expanded state. In a collapsed state when a temperature at the absorber is below a pre-defined transition temperature, corresponding to an internal pressure below ambient pressure, the length of flexible piping prevents flow of the heat transfer fluid from the evaporator to the condenser, thereby thermally isolating the evaporator from the condenser, and disabling heat transfer from the evaporator to the condenser. In an expanded state when the temperature at the absorber is above the pre-defined transition temperature corresponding to an internal pressure above ambient pressure, the length of flexible piping allows flow of the heat transfer fluid from the evaporator to the condenser, thermally coupling the evaporator to the condenser, and enabling heat transfer from the evaporator to the condenser.

This squeeze valve can be used with a conventional solar collector and insulated solar panels. The evaporator section is typically placed inside the solar thermal collector. The condenser is typically outside the solar thermal collector, but can also be inside the solar thermal collector, in contact with the environment of the solar thermal collector. Typically, the condenser is positioned relatively higher than the position of the evaporator. Typically, the condenser fluid returns to the evaporator using gravity assisted return.

The use of simplified calculations to assist in the description of this embodiment should not detract from the utility and basic advantages of the invention.

It should be noted that the above-described examples, numbers used are to assist in the description of this embodiment.

Inadvertent typographical and mathematical errors should not detract from the utility and basic advantages of the invention.

It will be appreciated that the above descriptions are intended only to serve as examples, and that many other embodiments are possible within the scope of the present invention as defined in the appended claims.

What is claimed is:

1. An apparatus for overheat protection comprising:
   (a) a solar thermal collector including:
      (i) an absorber;
      (ii) a primary heat transfer loop in thermal contact with said absorber and configured to circulate a transfer fluid to absorb heat from said absorber and
   (b) a heat pipe including:
      (i) an evaporator containing at least two fluids a first fluid and a second fluid, said second fluid other than said first fluid, the combination of said fluids configured to transfer heat as a dual-fluid heat transfer fluid said evaporator in thermal contact with said absorber; and
      (ii) a condenser operationally connected to said evaporator, said condenser is in thermal contact with an environment outside of said solar thermal collector;
   wherein in a non-heat conducting state a temperature at said evaporator is below a transition temperature and said dual-fluid heat transfer fluid includes at least one said fluid in a liquid state and at least one said fluid in a gaseous state; and in a heat conducting state the temperature at said evaporator is above said pre-defined transition temperature, and said dual-fluid heat transfer fluid transfers heat from said evaporator to said condenser.

2. The apparatus of claim 1 wherein said solar thermal collector is an insulated solar panel.

3. The apparatus of claim 1 wherein said dual-fluid heat transfer fluid is configured to have an abrupt transition from a state of thermally isolating said evaporator from said condenser to a state of thermal coupling said evaporator to said condenser.

4. The apparatus of claim 3 wherein said abrupt transition occurs within an activation range of 10 degrees Celsius.

5. The apparatus of claim 1 further comprising:
   (b) an expansion volume operationally connected to said heat pipe,
   wherein as said temperature approaches said transition temperature, a portion of said dual-fluid heat transfer fluid flows from said heat pipe to said expansion volume, thereby extending a range of temperatures over which said internal pressure of said heat pipe remains within a given range around ambient pressure.

6. In the invention of claim 1 wherein said evaporator additionally functions as a heat storage device.

7. A method for overheat protection comprising the steps of:
   (a) deploying an evaporator in thermal contact with an absorber of a solar thermal collector,
      said solar thermal collector including a primary heat transfer loop in thermal contact with said absorber and configured to circulate a transfer fluid to absorb heat from said absorber,
      said evaporator containing at least two fluids a first fluid and a second fluid, said second fluid other than said first fluid, the combination of said fluids configured to transfer heat as a dual-fluid heat transfer fluid; and
   (b) deploying a condenser in thermal contact with an environment outside of said solar thermal collector, said condenser operationally connected to said evaporator,
   wherein in a non-heat conducting state a temperature at said evaporator is below a transition temperature and said dual-fluid heat transfer fluid includes at least one said fluid in a liquid state and at least one said fluid in a gaseous state; and in a heat conducting state the temperature at said evaporator is above said pre-defined transition temperature, and said dual-fluid heat transfer fluid transfers heat from said evaporator to said condenser.

8. The method of claim 7 wherein said solar thermal collector is an insulated solar panel.

9. The method of claim 7 wherein said dual-fluid heat transfer fluid is configured to have an abrupt transition from a state of thermally isolating said evaporator from said condenser to a state of thermal coupling said evaporator to said condenser.

10. The method of claim 9 wherein said abrupt transition occurs within an activation range of 10 degrees Celsius.

11. The method of claim 7 wherein said transition temperature is pre-defined before operation of the apparatus.

12. The method of claim 7 wherein said transition temperature is adjusted to a second transition temperature after beginning operation of the apparatus.

13. The method of claim 7 wherein said transition temperature is adjusted by modifying a composition of said dual-fluid heat transfer fluid, said composition selected from the group consisting of:
   (a) air/water;
   (b) air/glycol/water;
   (c) argon/water;
   (d) argon/glycol/water;
   (e) nitrogen/water; and
   (f) nitrogen/glycol/water.

14. The method of claim 7 wherein said transition temperature is adjusted by a modification selected from the group consisting of:
   (a) modifying a ratio of said at least two fluids in said dual-fluid heat transfer fluid;
   (b) modifying an amount of dual-fluid heat transfer fluid in the apparatus;
   (c) modifying said condenser volume;
   (d) modifying said evaporator volume;
   (e) modifying an internal pressure of the apparatus; and
   (f) addition of an expansion volume to said condenser.

15. The method of claim 7 further comprising the step of:
   (c) deploying an expansion volume operationally connected to said condenser,
   wherein as said temperature approaches said transition temperature, a portion of said dual-fluid heat transfer fluid flows from said heat pipe to said expansion volume, thereby extending a range of temperatures over which said internal pressure of said heat pipe remains within a given range around ambient pressure.

16. In the invention of claim 7 wherein said evaporator additionally functions as a heat storage device.

* * * * *